(12) United States Patent
Rosati et al.

(10) Patent No.: US 9,930,989 B2
(45) Date of Patent: Apr. 3, 2018

(54) APPARATUS FOR BREWING BEVERAGES

(71) Applicant: Spectrum Brands, Inc., Middleton, WI (US)

(72) Inventors: Daniele Rosati, Verona, WI (US); Mia Cheeseman, Middleton, WI (US); Kurt Rottier, Beaver Dam, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 14/201,146

(22) Filed: Mar. 7, 2014

(65) Prior Publication Data

US 2014/0272047 A1    Sep. 18, 2014

Related U.S. Application Data

(60) Provisional application No. 61/781,644, filed on Mar. 14, 2013.

(51) Int. Cl.
*A47J 31/04* (2006.01)
*A47J 31/44* (2006.01)

(52) U.S. Cl.
CPC .................. *A47J 31/4403* (2013.01)

(58) Field of Classification Search
CPC ...... A47J 31/002; A47J 31/10; A47J 31/4403; A47J 31/446; A47J 31/46; A23F 5/26
USPC ......... 99/275, 280, 281, 284, 285, 287, 298, 99/299, 300, 302 P, 304, 305, 306, 323.3; 426/431, 432, 433, 435, 595
See application file for complete search history.

(56) References Cited

U.S. PATENT DOCUMENTS

| | | | | | |
|---|---|---|---|---|---|
| 3,358,618 | A | * | 12/1967 | Vetta | ............................ 99/450.1 |
| 4,112,830 | A | * | 9/1978 | Saito | ..................... A47J 31/002 99/300 |
| 4,138,936 | A | * | 2/1979 | Williams | ........................ 99/282 |
| 5,358,725 | A | * | 10/1994 | Izumitani | .................. A23F 3/18 426/238 |
| 5,740,719 | A | * | 4/1998 | Triola | ..................... A23F 5/243 99/275 |
| 6,752,069 | B1 | * | 6/2004 | Burke et al. | .................... 99/280 |
| 2003/0213370 | A1 | * | 11/2003 | Hammad | ............ A47J 31/4478 99/300 |
| 2006/0000192 | A1 | * | 1/2006 | Lindstrom | ...................... 53/587 |
| 2006/0102012 | A1 | * | 5/2006 | Pope | ................... A47J 31/4478 99/300 |

(Continued)

FOREIGN PATENT DOCUMENTS

GB         1097252  A  *  1/1968

*Primary Examiner* — Phuong Nguyen
(74) *Attorney, Agent, or Firm* — Kagen Binder, PLLC (57) ABSTRACT

In a beverage brewing apparatus and method for brewing a beverage from a ground ingredient, a filter is configured for containing the ground ingredient. A distribution system is coupled in fluid communication with a source of liquid. A showerhead is disposed above the filter and is coupled in fluid communication with the distribution system for receiving liquid from the source of liquid. The showerhead is rotatable about a rotation axis thereof and has an exit nozzle through which liquid delivered to the showerhead by the distribution system exits the showerhead for delivery to the filter. The exit nozzle is located other than at the rotation axis of the showerhead such that liquid is channeled into the filter in a generally circular pattern upon rotation of the showerhead.

19 Claims, 4 Drawing Sheets

(56) References Cited

U.S. PATENT DOCUMENTS

| | | | |
|---|---|---|---|
| 2009/0266239 A1* | 10/2009 | Noordhuis | A47J 31/0647 |
| | | | 99/295 |
| 2012/0183659 A1* | 7/2012 | Hulett | A23F 5/262 |
| | | | 426/431 |
| 2013/0082130 A1 | 4/2013 | Hulett et al. | |
| 2013/0125759 A1* | 5/2013 | Lin | 99/281 |
| 2013/0200176 A1* | 8/2013 | Alcamo | B05B 1/14 |
| | | | 239/245 |
| 2014/0076172 A1* | 3/2014 | Bowman | 99/323 |
| 2014/0144330 A1* | 5/2014 | Huang | 99/300 |

\* cited by examiner

APPARATUS FOR BREWING BEVERAGES

CROSS REFERENCE TO RELATED APPLICATIONS

This application claims priority to U.S. Provisional Patent Application Ser. No. 61/781,644 filed Mar. 14, 2013 for "APPARATUS AND METHOD FOR BREWING BEVERAGES," which is hereby incorporated by reference herein in its entirety.

BACKGROUND

The field of the disclosure relates generally to apparatus and methods for making beverages from ground ingredients, and more particularly for brewing hot beverages from ground ingredients.

Beverage brewing appliances, such as coffee makers, are typically somewhat automated and come in many different types, such as automatic drip machines, which use gravity to drip hot water through coffee grounds, and automatic single-serve pod brewers, which use pressurized hot water pumped into a sealed brew chamber. While these coffee makers are convenient, some individuals prefer a more manual or otherwise user-oriented experience when brewing beverages such as coffee.

To this end, one popular method among coffee connoisseurs and baristas is to use what is referred to as the pour-over technique when making coffee. The pour-over technique allows one to manually prepare customized beverages in smaller portions, which is believed to better extract the flavors from the brew ingredients. In addition, the pour-over technique can reduce possible waste from preparing a customized beverage in larger portions. Furthermore, because the pour-over technique is manual, the consumer can experience (e.g., participate in, or at least view) the entire brewing process, thus obtaining a user experience not available with a typical automated brewing appliance.

In the pour-over technique, hot water is slowly poured, often in a generally swirling pattern, into a cone shaped filter that contains coffee grounds and is held or otherwise retained above a cup or carafe. The hot water wets the coffee grounds in the filter and drips through the filter into the carafe or cup. One drawback of this conventional pour-over technique is that it is entirely manual, and thus can result in inconsistent brewing. Additionally, it takes considerably more time than brewing with conventional automated brewers.

There is a need, therefore, for automating the pour-over brewing process to provide improved efficiency and consistency of single-serve customized beverage recipes while simultaneously providing the desired user experience associated with the pour-over brewing process.

BRIEF DESCRIPTION

In one aspect, a beverage brewing apparatus for brewing a ground ingredient using a liquid from a source of liquid generally comprises a filter configured for containing the ground ingredient, and a distribution system in fluid communication with the source of liquid. A showerhead is disposed above the filter and is in fluid communication with the distribution system for receiving liquid from the source of liquid. The showerhead is rotatable about a rotation axis thereof and has an exit nozzle through which liquid channeled to the showerhead by the distribution system exits the showerhead for delivery to the filter. The exit nozzle is located other than at the rotation axis of the showerhead such that liquid is channeled into the filter in a generally circular pattern upon rotation of the showerhead.

In another aspect, a beverage brewing apparatus for brewing a ground ingredient using a liquid from a source of liquid comprises a filter configured for containing the ground ingredient. The apparatus also comprises a rotatable showerhead disposed above the filter. The showerhead is configured to deliver a stream of the liquid into the filter in a generally circular pattern upon rotation of the showerhead. In addition, the apparatus includes a liquid distribution system coupled in fluid communication with the source of liquid. The liquid distribution system has a first conduit and a second conduit that is separate from the first conduit. The apparatus also has a controller operatively coupled to the liquid distribution system. The controller is configured to independently control flow of the liquid through the first and second conduits of the liquid distribution system.

In another aspect, a method for brewing a beverage generally comprises loading ground ingredients into a filter, with the filter being located relative to a container such that liquid passing through the filter collects in the container. Channeling a liquid from a source of liquid to a showerhead, with the showerhead being positioned above the filter and being rotatable relative to the filter about a rotation axis of the showerhead. The showerhead has at least one exit nozzle through which liquid exits the showerhead, with the at least one exit nozzle being offset from the rotation axis of the showerhead. The method also includes rotating the showerhead while channeling the liquid from the source of liquid to the showerhead to thereby deliver the liquid from the showerhead into the filter in a generally circular pattern.

DRAWINGS

Corresponding reference characters indicate corresponding parts throughout the several views of the drawings.

DETAILED DESCRIPTION

Figure 1:
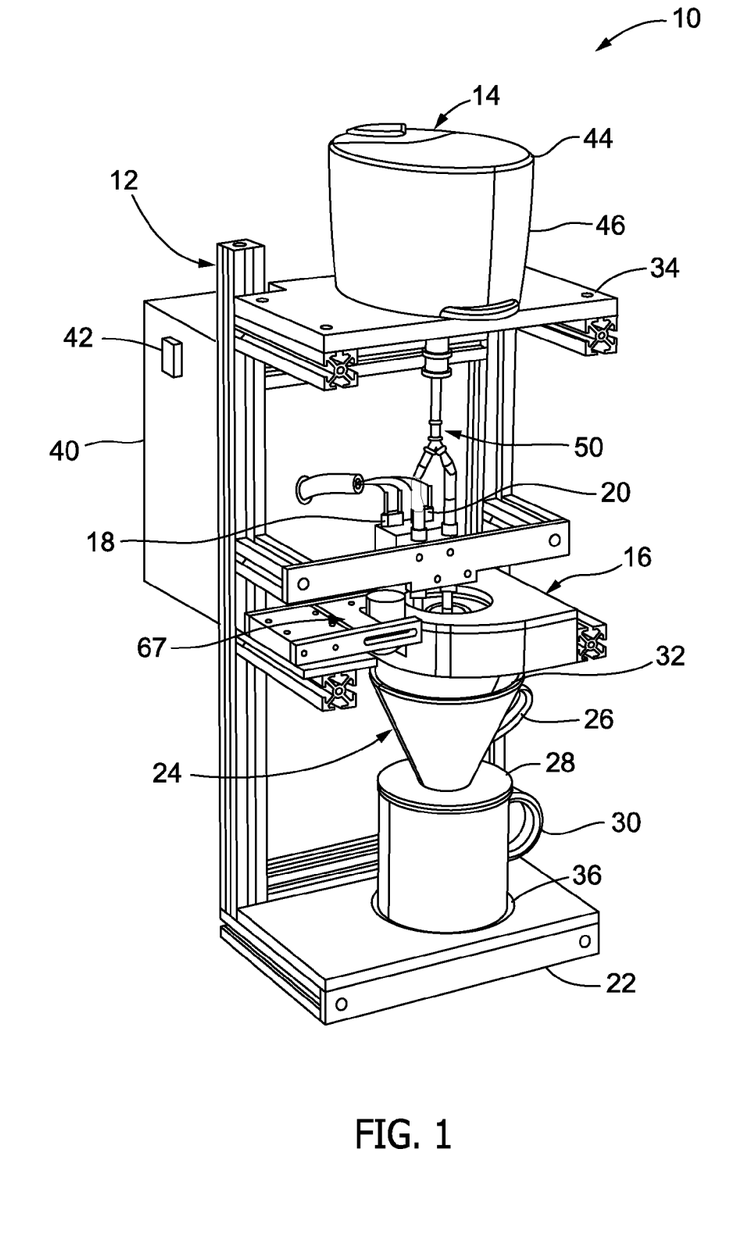
FIG. 1 is a perspective view of one embodiment of apparatus for brewing beverages.
Figure 2:
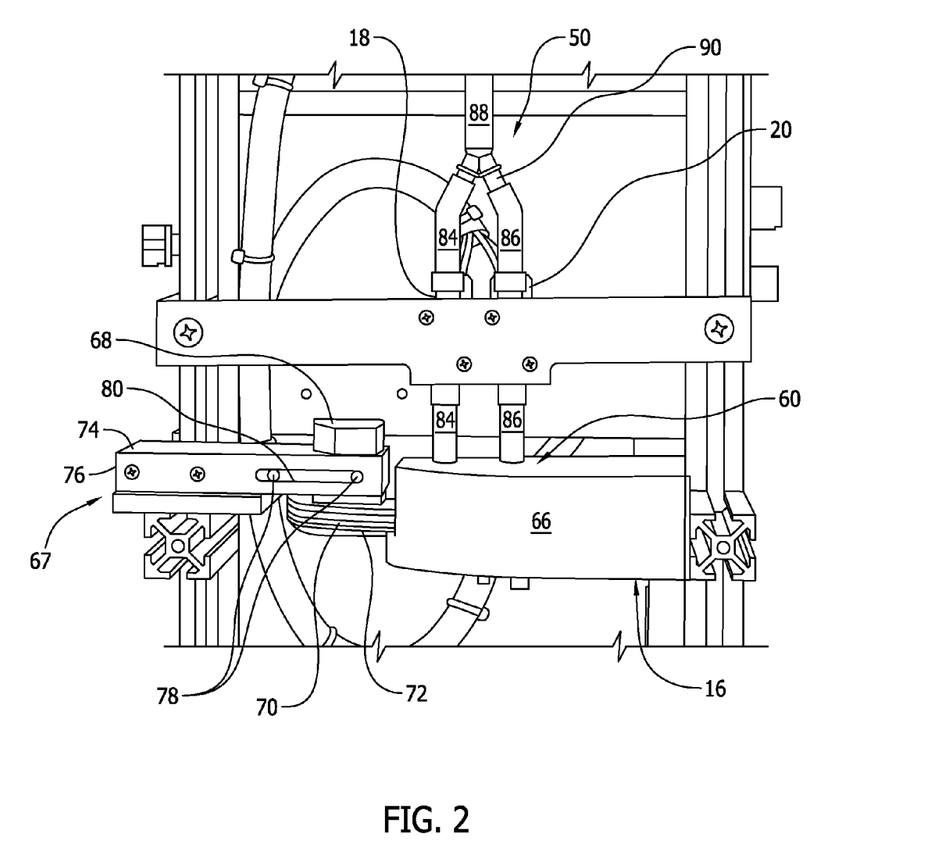
FIG. 2 is a partial front elevation of the apparatus of FIG. 1 including a liquid distribution system and showerhead assembly.
Figure 3:
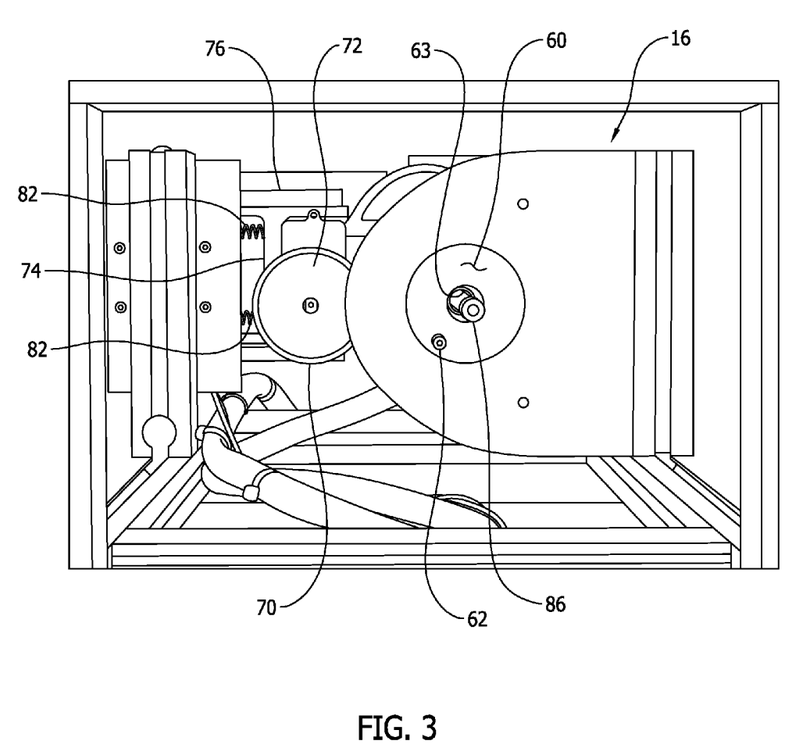
FIG. 3 is a bottom plan view of the showerhead assembly of FIG. 2.

The apparatus and methods described herein relate to the hot brewing of beverages from ground brewable ingredients such as, without limitation, coffee and tea. With reference to the drawings, and in particular to FIGS. 1-3, one embodiment of apparatus for brewing beverages is indicated generally at 10. The brewing apparatus 10 generally comprises, a frame 12 configured to support one or more of the various components of the apparatus, including without limitation one or more liquid, electrical and/or mechanical components as described in further detail herein. The illustrated frame 12 is a generally open frame structure with a top platform 34 and a base 22 to permit a user to view the entire brewing process, thus facilitating a user experience not available with a typical home brewing appliance. It is understood, however, that in other embodiments the apparatus 10 may include a housing or other guard structure enclosing all or some of the components of the appliance. In such embodiments, the housing or guard structure may be transparent, or may include apertures, mesh, cage material, or other materials that sufficiently protect the components of the appliance 10 without obstructing the view of the brewing process. The illustrated frame 12 is in the general form of a rectangular prism, or cuboid-shaped structure (e.g., generally rectangular in transverse cross-section). Alternatively, however, the frame 12 can have any suitable shape, such as a cylindrical or other prismatic shape, that permits the frame 12 to operate as described herein. The frame 12 may be fabricated from any suitable materials, such as metals and/or plastics, that otherwise permit the frame 12 to operate as described herein.

With particular reference to FIG. 1, the appliance generally includes, from top to bottom in the orientation illustrated in FIG. 1, a heating system 14, a distribution system 50 for delivering heated liquid from the heating assembly, a showerhead assembly 16, a filter 32 supported by a suitable brew basket 24, and a container 30 such as a cup or carafe into which the brewed beverage is dispensed. The heating system 14 includes at least a reservoir 46 (broadly, a source of heated liquid) supported by a platform 34 at the top of the frame 12 for holding a heated liquid, such as—without limitation—water or other suitable liquid for brewing beverages. A lid 44 is provided for accessing the interior of the reservoir 46 when filling the reservoir. For example, hot water may be poured into the reservoir 46 just prior to brewing a beverage. The reservoir 46, in one example, has a liquid volume capacity in the range of about 180 cubic centimeters (cc) (6 fluid ounces (fl. oz.)) to about 475 cc (16 fl. oz.). Alternatively, the reservoir may have any suitable liquid volume capacity that permits the apparatus 10 to operate as described herein.

In a more suitable embodiment, the heating system 14 further comprises a heating unit (not shown) in communication with the reservoir 46 for heating or maintaining the temperature of the liquid in the reservoir. The heating unit may be located within the reservoir 46 or it may be located exterior of, or even remote from the reservoir. It is also contemplated that the reservoir 46 or other source of heated liquid may be located remote from the frame 12, by itself or along with the heating unit, without departing from the scope of this invention. The heating unit according to one example heats the brewing liquid to (or maintains the liquid at) a temperature in the range of about 97 degrees Celsius (° C.) (205 degrees Fahrenheit (° F.)) to about 100° C. (212° F.). The heating unit may be an electric heating unit or any other suitable heating unit that permits the apparatus 10 to operate as described herein.

The distribution system 50 is operable to regulate the distribution of liquid from the heating system 14 to the showerhead assembly 16. In one suitable embodiment, the distribution system 50 regulates the flow rate and/or the timing of delivery of heated liquid from the heating system 14 to the showerhead assembly (and hence the filter 32). In the illustrated embodiment, the distribution system 50 includes a suitable controller 40 that controls the automated brewing process. The controller 40 may be supported by the frame 12 as illustrated in FIG. 1, although in other embodiments the controller may be separate or otherwise distal from the frame. The controller 40 may comprise any of various controller systems, user interfaces, switches (such as, e.g., power switch 42), circuits, and the like. The controller 40 according to one embodiment suitably includes one or more voltage regulator and/or transformers (not shown) as needed to supply appropriate power to the various electrical components of the apparatus 10. The power switch 42 may be implemented as a momentary contact switch to facilitate "auto shut-off" functionality in association with the controller 40, as is common in many household appliances.

In the exemplary embodiment, the controller 40 controls at least the power to the various operating components of the apparatus 10, the flow rate and/or timing of heated liquid delivered by the distribution system 50, the temperature of the liquid in the reservoir 46, and an electric motor drive assembly 67 (FIG. 2, and described later herein) associated with the showerhead assembly 16. It is contemplated that in some embodiments, the controller 40 may be configured to control apparatus 10 wirelessly or remotely. It is also contemplated that the controller 40 may be programmed for preparing customized beverage recipes, based upon the sequence, timing, and/or flow rate of the liquid delivered by the distribution system 50.

As illustrated best in FIG. 2, the distribution system 50 further includes a Y-shaped connector 90 having a single outlet conduit 88 in fluid communication with the reservoir 46, and a pair of inlet conduits 84, 86 in fluid communication at one (the upper) end with the outlet conduit 88 and at the other (the lower) end with the showerhead assembly 16. The conduits 84, 86, 88 may be flexible, or may include one or more flexible couplings, to allow for movement relative to the showerhead assembly 16. Suitable flow splitters other than a Y-shaped connector 90 may be used, such as a T-connector, distribution manifold or other suitable device. It is also understood that in other embodiments a single flow line may be used to deliver heated liquid from the reservoir 46 to the showerhead assembly 16 without departing from the scope of this invention.

The illustrated distribution system also includes valves 18, 20, each corresponding to and more particularly disposed along a respective one of the inlet conduits 84, 86 to allow control over the delivery of heated liquid from the reservoir 46 to the showerhead assembly 16. For example, the controller 40 may be electrically coupled to the valves 18 and 20 to open and close the valves at desired intervals to deliver the heated liquid from the reservoir 46 to the showerhead assembly 16 according to a predetermined process. The valves 18 and 20 may thus be activated or deactivated by the controller 40 to allow the liquid flowing through the distribution system 50 to be delivered at various flow rates depending on whether either or both of the valves 18 and 20 are activated. Thus, in the exemplary embodiment, for example, a different flow rate may be used for the inlet conduit 86 than for the other inlet conduit 84. Alternatively, or additionally, one or more flow regulators can be coupled within the fluid conduits 84 and/or 86, either upstream or downstream of the valves 18 and 20, to control the flow rate of liquid flowing through the inlet conduits 84 and 86, respectively, to the showerhead assembly 16.

With reference to FIGS. 2 and 3, the showerhead assembly 16 includes a generally disc-shaped showerhead 60 disposed within a suitable housing 66. The housing 66 is supported by the frame with the showerhead 60 rotatably mounted to the housing for rotation about a rotation axis that is oriented vertically in the illustrated embodiment of FIGS. 1-3. In the illustrated embodiment, one inlet conduit 86 extends through a central opening 63 of the showerhead 60 (e.g., on the axis of rotation of the showerhead) so that heated liquid is delivered through the inlet conduit 86 for delivery directly to the filter 32 without being fed to the showerhead 60. The other inlet conduit 84 is in fluid communication with the showerhead for delivering heated liquid from the reservoir 46 to the rotatable showerhead 60. The showerhead 60, as best seen in FIG. 3, includes an outlet nozzle 62 through which heated liquid is dispensed from the showerhead to the filter 32. The nozzle 62 is radially offset from the axis of rotation of the showerhead 60 so that the nozzle orbits about the rotation axis of the showerhead upon rotation thereof. The showerhead 60 including the nozzle 62 can be fabricated from any suitable materials, such as metals and/or plastics, that permit the components to operate as described herein.

It is understood that in other embodiments the inlet conduit 86 may be omitted such that heated liquid is delivered solely to the showerhead 60 for dispensing through the nozzle 62. It is also contemplated that the showerhead may have more than one nozzle, such as at different circumferential positions about the showerhead 60 and/or at different radial positions of the showerhead.

Rotation of the showerhead 60 is effected by a suitable drive system 67 including a drive motor 68 operatively coupled to the controller 40. In the illustrated embodiment, a mounting plate 76 is fixedly mounted on the frame, and a carriage 74 is slidably mounted on the mounting plate for sliding (e.g., translating) movement relative to the mounting plate 76 and the housing 66 of the showerhead assembly 60. More particularly, mounting pins 78 are slidably disposed in opposed slots 80 (one being shown in FIG. 2) of the mounting plate 76 and slidably mount the carriage 74 on the mounting plate 76. A pair of springs 82 (FIG. 3) are disposed transversely between the mounting plate 76 and the carriage 74 to bias the carriage transversely toward the showerhead assembly 16. The drive motor 68 is carried by the carriage 74 and a drive wheel 72 is operatively driven by the drive motor. In the illustrated embodiment, the drive wheel 72 includes a circumferential friction surface, such as in the form of one or more elastomeric bands 70 extending circumferentially about the circumference of the drive wheel. The elastomeric bands 70 may be fabricated from any suitable elastomeric material. The elastomeric bands 70 provide frictional engagement of the drive wheel 72 against the rotatable showerhead 60 via the biasing force of the springs 82 such that operation of the drive motor 68 drives rotation of the showerhead 60. The springs 82 provide an appropriate amount of force to keep the drive wheel 72 frictionally engaged with the showerhead 60 without slipping during operation of the drive motor 68. It is understood that the showerhead 60 may be driven in rotation by any suitable drive system other than the illustrated drive system 67, including mechanical, pneumatic, hydraulic, manual, and/or other non-electric drive systems without departing from the scope of this invention.

With reference back to FIG. 1, the brew basket 24 is formed as a hollow, substantially inverted frustoconical structure, open at both the top and bottom to allow liquid to pass therethrough. Alternatively, brew basket 24 may have any other suitable shape suitable to support the filter 32. A cover 28 extends outward from the bottom of the brew basket 24 for covering the container 30 during the brewing process. The brew basket 24 in one embodiment may include a handle 26 to facilitate the handling of the brew basket 24 by a user. In one embodiment, the brew basket 24 and more particularly the cover 28 may be configured for removably coupling the brew basket to the container 30. Alternatively, the brew basket 24 and more particularly the cover 28 may simply seat (e.g., rest) on the top of the container 30. In other embodiments, the brew basket 24 may be supported, such as by the frame or other suitable structure, in spaced relationship above the container 30. The brew basket 24 may be constructed from any suitable material, such as metal, glass, ceramic, and/or plastic, that permits the apparatus 10 to operate as described herein.

The filter 32 is constructed of any suitable material for filtering liquid therethrough while holding the ground ingredients therein. For example, in one embodiment the filter 32 comprises a conventional coffee filter material having an inverted cone shape. Alternatively, the filter 32 may be a bag or pouch-like shape (e.g., a tea bag) to enclose the beverage ingredients therein. The filter 32 is suitably formed separate from the brew basket 24 and inserted therein during use so the filter is removable from the brew basket and disposable following use. In other embodiments, the filter 32 may be formed integrally with the brew basket 24.

The container 30 comprises any of many conventional shapes and materials suitable for use as a brewed beverage container, such as a common ceramic coffee mug, an insulated travel cup, or the like. As shown in FIG. 1, the container 30 rests on the base 22 of the frame 12. More particularly, the base 22 includes a seat 36 inset into the upper surface of the base to facilitate proper alignment and positioning of the container 30 on the base. In particular, as illustrated best in FIG. 1, the seat 36 positions the container 30 such that positioning of the brew basket 24 on the container with the filter 32 in the brew basket generally coaxially aligns the conically-shaped filter with rotation axis of the showerhead 60 and hence the inlet conduit 86. In this manner, heated liquid delivered through the inlet conduit 86 flows generally directly down onto grounds contained within the filter 32, while liquid delivered through the nozzle 62 of the showerhead 60 upon rotation of the showerhead flows down onto the grounds in a generally circular pattern.

Figure 4:
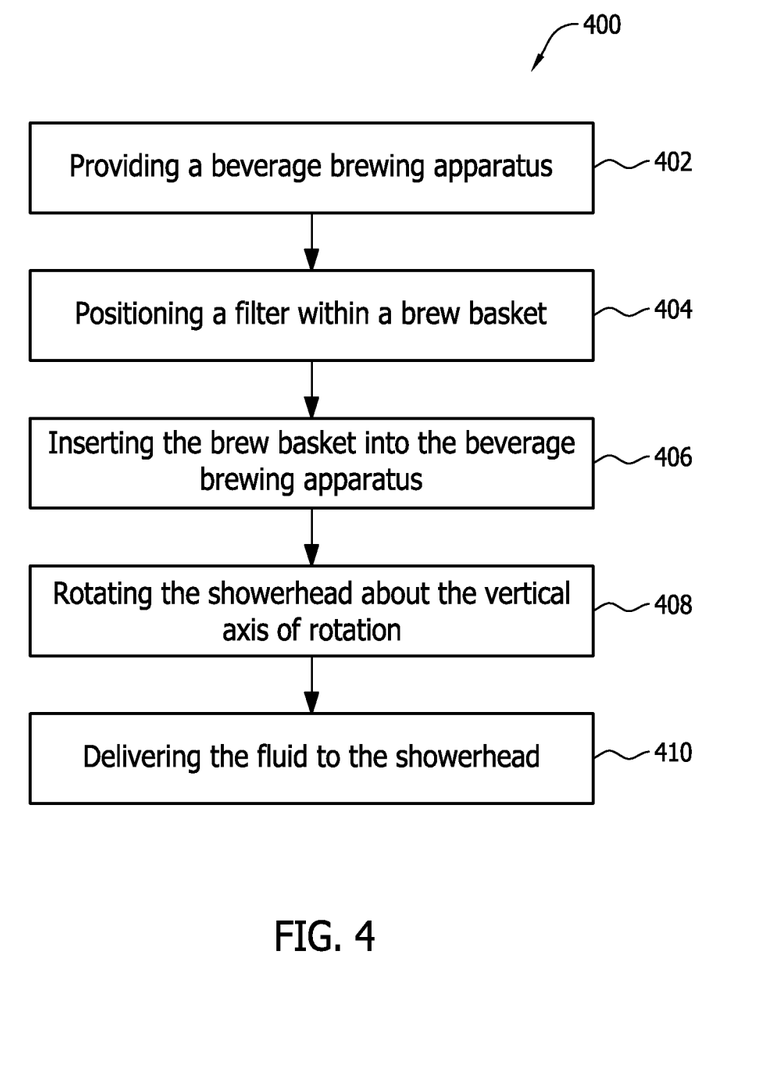
FIG. 4 is a flow chart of an exemplary method for brewing a beverage using the apparatus of FIG. 1.

FIG. 4 is a flow chart of one embodiment of a method 400 for brewing a beverage using the apparatus 10. In the exemplary method, the apparatus 10 is provided 402 and the cone-shaped filter 32 is positioned 404 into the brew basket 24. Prior to placing the ground ingredients, e.g., coffee or tea, in the filter 32, the user may prefer to wet the filter 32 to facilitate reducing unwanted flavor that may be given off by the filter 32. The user may then place the ground ingredients into filter 32. For coffee, in general, the user may use a medium grind and a coffee-grounds-to-water ratio of about 16 grams of coffee per 10 fl. oz. of water. However, it is understood that this may vary depending on a number of factors including the coffee type and preferred strength of the brewed beverage. The user then inserts 406 the brew basket 24 with the filter 32 and the ingredients into the apparatus 10, such as by placing on the container 30 while placing the container 30 into the seat 36 on the base 22. The user may then open the lid 44 of the reservoir 46 and pour a predetermined amount of water into the reservoir. The user then closes the lid 44 and presses the power switch 42 to start the brewing process.

At the initiation of the brewing process, the controller 40 provides power to the heating unit to begin heating the water in the reservoir 46. The controller 40 shuts off the heating unit after the water reaches a desired temperature, such as in the range of about 97° C. (205° F.) to about 100° C. (212° F.). The controller 40 may then pause for approximately 30 to 45 seconds to allow the heated water to cool to a temperature ranging between approximately 90.5° C. (195° F.) and approximately 96° C. (205° F.) before initiating delivery of the water to the filter 32. The controller 40 may then transmit power to the drive motor 67 to rotate 408 the showerhead assembly 60 while simultaneously actuating the valve 20 to deliver 410 a first predetermined amount of water through the conduit 86 directly into the brew basket 24 and filter 32. The first predetermined amount of fluid is substantially less than the total amount of fluid used to brew the beverage.

The controller 40 may then pause for approximately 10 to 20 seconds, thereby allowing the ingredients to "bloom," or to release carbon dioxide. After allowing the wet ingredients to bloom, the controller 40 actuates the valve 18 to deliver a second predetermined amount of water to the showerhead 60. The second predetermined amount of water exits the rotating showerhead 60 through the nozzle 62 thereby contacting the ground ingredients in a circular flow path. The controller 40 then pauses for a second predetermined period to allow at least a portion of the fluid to contact the ingredients and flow through the filter 32 into the container 30. The controller 40 repeats the process of delivering a second predetermined amount of water and pausing a second predetermined period until all the fluid in the reservoir 46 is delivered. The controller 40 then shuts off the apparatus 10.

Accordingly, embodiments of the apparatus 10 disclosed herein facilitate automating the pour-over process to provide improved efficiency and consistency of single-serve customized beverage recipes while simultaneously providing the user experience of the manual process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A beverage brewing apparatus for brewing a ground ingredient using a liquid from a source of liquid, the apparatus comprising:
    a filter configured for containing the ground ingredient;
    a distribution system in fluid communication with the source of liquid, the distribution system including a first conduit, wherein the first conduit is in fluid communication with a rotatable showerhead;
    wherein the showerhead is disposed above the filter, the showerhead having an upstream side and a downstream side opposite the upstream side, the upstream side being in fluid communication with the first conduit of the distribution system for receiving liquid from the source of liquid, the showerhead being rotatable on a rotation axis thereof and the showerhead having a first exit nozzle at the downstream side of the showerhead through which liquid channeled to the upstream side of the showerhead through the first conduit of the distribution system exits the showerhead for delivery to the filter, the first exit nozzle being located other than at the rotation axis of the showerhead such that liquid is channeled into the filter in a generally circular pattern upon rotation of the showerhead;
    wherein the first conduit is fixed in position at the upstream side of the rotatable showerhead at a first distance from the rotation axis of the showerhead so that the showerhead is movable relative to the first conduit, and
    wherein the distribution system further includes a second conduit in fluid communication with a second exit nozzle through which liquid channeled to the second conduit of the distribution system exits for delivery to the filter, the second exit nozzle being fixed with relation to the source of liquid.

2. The apparatus of claim 1 further comprising a drive system operatively coupled to the showerhead, the drive system configured to rotate the showerhead.

3. The apparatus of claim 2 wherein the drive system comprises a drive motor and a drive wheel operatively coupled to the drive motor for conjoint rotation therewith, the drive wheel having a circumferential surface configured for frictional engagement with the showerhead to operatively couple the drive motor to the showerhead such that operation of the drive motor rotates the showerhead.

4. The apparatus of claim 3 wherein the drive wheel comprises an elastomeric material extending about the circumferential surface of the drive wheel.

5. The apparatus of claim 1 further comprising a brew basket configured to retain the filter and a container configured to receive liquid from the filter.

6. The apparatus of claim 5 wherein the brew basket is configured for releasable connection with the container.

7. The apparatus of claim 5 wherein the apparatus further comprises a base for supporting the container, the base having an alignment feature to facilitate proper alignment of the container on the base such that the brew basket and filter are disposed beneath the showerhead.

8. The apparatus of claim 1, further comprising a fixed showerhead housing located proximate to the showerhead, wherein the first and second conduits are coupled to an upstream side of the fixed showerhead housing.

9. The apparatus of claim 1, wherein the distribution system includes a controller operatively coupled to a first valve and a second valve;
    wherein the controller is configured to independently control flow of the liquid through the first conduit using the first valve; and
    wherein the controller is configured to independently control flow of the liquid through the second conduit using the second valve.

10. The apparatus of claim 9, wherein the independently-controlled flow of the liquid through the first conduit and the second conduit includes controlling a coffee-grounds-to-water ratio of the liquid through the respective first and second conduits.

11. The apparatus of claim 9, wherein the independently-controlled flow of the liquid through the first conduit and the second conduit includes controlling a flow rate of the liquid through the respective first and second conduits.

12. The apparatus of claim 9, wherein the independently-controlled flow of the liquid through the first conduit and the second conduit includes controlling heat of the liquid through the respective first and second conduits.

13. The apparatus of claim 9, wherein the independently-controlled flow of the liquid through the first conduit and the second conduit includes controlling timing of the liquid through the respective first and second conduits.

14. The apparatus of claim 1, wherein the showerhead includes a third exit nozzle being located other than at the rotation axis of the showerhead, the third exit nozzle being located other than at the same radial and circumferential location of the first exit nozzle, and the third exit nozzle being in fluid communication with the second conduit.

15. The apparatus of claim 1, wherein the second exit nozzle is fixed with relation to the filter.

16. The apparatus of claim 1, wherein the flow of the liquid through the second exit nozzle extends through an opening at the rotation axis of the showerhead.

17. The apparatus of claim 1, wherein the second conduit passes through an opening of the showerhead provided at the rotation axis of the showerhead for liquid delivery directly to the filter from a second exit nozzle at an end of the second conduit.

18. A beverage brewing apparatus for brewing a ground ingredient using a liquid from a source of liquid, the apparatus comprising:

a filter configured for containing the ground ingredient;

a distribution system in fluid communication with the source of liquid, the distribution system including a first conduit and a second conduit, wherein the first conduit is in fluid communication with a rotatable showerhead;

wherein the showerhead is disposed above the filter, the showerhead having an upstream side and a downstream side opposite the upstream side, the upstream side being in fluid communication with the first conduit of the distribution system for receiving liquid from the source of liquid, the showerhead being rotatable on a rotation axis thereof and the showerhead having a first exit nozzle at the downstream side of the showerhead through which liquid channeled to the first conduit on the upstream side of the showerhead through the first conduit of the distribution system exits the showerhead for delivery to the filter, the first exit nozzle being located other than at the rotation axis of the showerhead such that liquid is channeled into the filter in a generally circular pattern upon rotation of the showerhead;

wherein the second conduit is in fluid communication with a second exit nozzle through which liquid channeled to the second conduit of the distribution system exits for delivery to the filter, the second exit nozzle being fixed with relation to the filter; and wherein the first conduit is fixed in position at the upstream side of the rotatable showerhead at a first distance from the rotation axis of the showerhead so that the showerhead is movable relative to the first conduit.

19. The apparatus of claim 18, wherein the second conduit passes through an opening of the showerhead provided at the rotation axis of the showerhead for liquid delivery directly to the filter from the second exit nozzle at an end of the second conduit.

* * * * *